United States Patent [19]
Herkoperec et al.

[11] Patent Number: 5,653,511
[45] Date of Patent: Aug. 5, 1997

[54] RELEASE FOR A BICYCLE WHEEL

[76] Inventors: Mark Herkoperec, 534a Willow Turn, Mt. Laurel, N.J. 08054; Donald W. Brutscher, 55 Dartmouth Dr., Delran, N.J. 08075

[21] Appl. No.: 514,686

[22] Filed: Aug. 14, 1995

[51] Int. Cl.$^6$ .................................................. B60B 21/00
[52] U.S. Cl. ..................... 301/124.2; 301/110.5
[58] Field of Search ................... 301/110.5, 111, 301/124.2; 280/279

[56] References Cited

U.S. PATENT DOCUMENTS

| | | | |
|---|---|---|---|
| 4,079,958 | 3/1978 | Segawa | 301/124.2 |
| 4,400,038 | 8/1983 | Hosokawa | 301/124.2 |
| 4,679,862 | 7/1987 | Luo | 301/124.2 X |
| 5,022,672 | 6/1991 | Kawai | 301/110.5 |
| 5,121,973 | 6/1992 | Phillips | 301/110.5 |

*Primary Examiner*—Russell D. Stormer

[57] ABSTRACT

A release for a bicycle wheel including, a U-shaped head that has an aperture therein with a pair of angular openings extending from a wall into an interior area of the head and a proximal end. Included is a housing with a truncated member coupled to a distal end with a central opening therethrough, a proximal end and an interior wall that has a cam. A button assembly has a first cylindrical member with a first base portion having peripheral projections engaging the cam of the housing and pushing member. Also, included is a second cylindrical member with a stem and a second base portion with peripheral projections for engaging a terminating portion of the cam of the housing. The stem of the second member telescopically engages the first cylindrical member. A rod has a first end with wing-like projections positionable within the cup-shaped head, a intermediate portion positioned within a hub body of a bicycle wheel and a second end positionable within the button assembly.

11 Claims, 5 Drawing Sheets

RELEASE FOR A BICYCLE WHEEL

BACKGROUND OF THE INVENTION

1. Field of the Invention

The present invention relates to a release for a bicycle wheel and more particularly pertains to quick and easy release of the wheel of a bicycle from between the bicycle component when the user needs to remove the wheel and further allowing ready release by pushing inward a spring loaded button mechanism.

2. Description of the Prior Art

The use of quick release bolts and clamping devices is known in the prior art. More specifically, quick release bolts and clamping devices heretofore devised and utilized for the purpose of self-locking fasteners and clamps are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,339,660 to Fell discloses a quick release hub. U.S. Pat. No. 5,214,945 to Martin discloses a locking assembly for use on a nut or bolt head. U.S. Pat. No. 5,205,693 to Fuller, Suggs and Ambrico discloses a quick release bolt. U.S. Pat. No. 5,152,161 to Lee discloses an adjustable cam lock. U.S. Pat. No. 5,135,330 to Chen discloses a quick release clamping device. Lastly, U.S. Pat. No. 4,478,546 to Mercer discloses a quick insertion and release bolt system.

While these devices fulfill their respective, particular objectives and requirements, the aforementioned patents do not describe a release for a bicycle wheel that allows a bicycle rider to remove the wheel from the bicycle component of the bicycle and replacement of the wheel without tools through the use of a button mechanism.

In this respect, the release for a bicycle wheel according to the present invention substantially departs from the conventional concepts and designs of the prior art, and in doing so provides an apparatus primarily developed for the purpose of quick and easy release of the wheel of a bicycle from between the bicycle component when the user needs to remove the wheel and further allowing ready release by pushing inward a spring loaded button mechanism.

Therefore, it can be appreciated that there exists a continuing need for a new and improved release for a bicycle wheel which can be used for quick and easy release of the wheel of a bicycle from between the bicycle component when the user needs to remove the wheel and further allowing ready release by pushing inward a spring loaded button mechanism. In this regard, the present invention substantially fulfills this need.

SUMMARY OF THE INVENTION

In view of the foregoing disadvantages inherent in the known types of quick release bolts and clamping devices now present in the prior art, the present invention provides an improved release for a bicycle wheel. As such, the general purpose of the present invention, which will be described subsequently in greater detail, is to provide a new and improved release for a bicycle wheel.

To attain this, the present invention essentially comprises in combination a U-shaped cylindrical head. The head has an axial aperture with interior threaded walls therein and a plurality of teeth extending from a proximal end. Included is a metallic housing. The housing forms a first cylindrical member with a truncated member coupled thereto and having an interior surface with a circular rim therein. The first cylindrical member is capable of receipt therein a second cylindrical member arranged in a collinear orientation relative to the first cylindrical member. A portion of the second cylindrical member existing the first cylindrical member adjacent the truncated member. The second cylindrical member has a circular flange forming a base for engaging the rim of the first cylindrical member. The existing portion forms the upper end of a button mechanism. The button mechanism has a button and a helical spring contained within the housing. The spring is interior the first cylindrical member and adjacent the flange and a proximal end of the first cylindrical member. Also included is a rigid rod. The rod has a first end threaded for engaging the interior threaded walls of the U-shaped head, an intermediate portion and a second end positioned within the housing and integral with the second cylindrical member. The intermediate portion of the rod is positioned within a hub body of a bicycle wheel. The rod is capable of axial movement when exterior pressure is applied to the button and pushes the button in the direction of the proximal end of the first cylindrical member. The button being pushed urges the rod and moves the head away from a bicycle component of the bicycle to allow the wheel to be released. The button has the pressure removed is urged away from the proximal end of the first cylindrical member with the spring.

Furthermore, the present invention in the alternative comprises, a U-shaped head. The U-shaped head has a generally cylindrical aperture therein and a proximal end with a plurality of teeth extending therefrom. The aperture has an interior wall with a pair of angular openings extending from the wall into a portion of an interior area of the head. The teeth are capable of being positioned flush with a bicycle component of a bicycle. A metallic housing is provided. The housing has a truncated member coupled to a flat distal end with a central opening therethrough, a proximal end and a cylindrical interior forming an interior wall. An O-ring is included and is positioned within the housing and adjacent the truncated member. The interior wall has a cam means. The cam means covers an upper portion of the interior wall, beginning just below the distal end. The cam means stops at a ridge portion midway between the distal end and the proximal end of the housing. A button assembly is included. The button assembly has a first cylindrical member with a first base portion and a second cylindrical member with a second base portion. The first cylindrical member has a length with the first base portion comprising about ⅓ the length of the first cylindrical member. The first base portion has eight peripheral projections proportionately spaced and extending therefrom. The first cylindrical member is positionable within the housing with the peripheral projections engaging the cam means of the housing. The first cylindrical member has a pushing member extending exterior the distal end of the housing through the central opening with the first base portion contained within the housing. The second cylindrical member has a cylindrical stem and a second base portion coupled thereto. The stem has a diameter for slidable positioning within the first cylindrical member. The second base portion has a generally cylindrical configuration with a raised front end, a flat back end and four generally rectangular peripheral projections proportionately spaced and extending therefrom. The front end engages the first base of the first cylindrical member when the second cylindrical member is positioned therein. The rectangular projections of the second base portion engage the ridge portion of the cam means of the housing. Also included is a smooth cylindrical rod. The rod has a first end with a pair of wing-like projection spaced therefrom, an intermediate portion and a second end having a flange spaced therefrom with a bias spring adjacent thereto. The bias spring encompasses a portion of the rod, the rod further has a generally rectangular bore spaced from the first end and parallel thereto. The bore has housed therein a tension spring being in communication with an interior surface of the wing-like projections. The wing-like projections are capable of being retracted by the interior wall of the cup-shaped head when the first end of the rod is positioned within the aperture of the cup-shaped head. The wing-like projections are protracted to lockingly engage the angular openings of the interior walls of the cup-shaped head when the first end is position therein. The intermediate portion of the rod being positioned within a hub body of a bicycle wheel. Lastly, the second end of the rod is positionable within the second cylindrical member of the button assembly with the flat end of the second cylindrical member resting on the flange. The rod is capable of axial movement when exterior pressure is applied to the pushing member of the button assembly forcing the button assembly in the direction of the proximal end of the first cylindrical member. The button assembly being pushed urges the rod and moves the head away from a bicycle component of a bicycle to allow the wheel to be released. The button assembly with the pressure removed remains in a protracted position. The button assembly being pushed again urges the rod away from the proximal end of the first cylindrical member with the spring causing the button assembly to return to a retracted position.

There has thus been outlined, rather broadly, the more important features of the invention in order that the detailed in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the Even still another object of the present invention is to provide a new and improved quick and easy release of the wheel of a bicycle from between the bicycle component when the user needs to remove the wheel and further allowing ready release by pushing inward a spring loaded button mechanism.

Lastly, it is an object of the present invention to provide a new and improved release for a bicycle wheel including a U-shaped head. The head has an aperture therein with a pair of angular openings extending from a wall into an interior area of the head and a proximal end. A housing is provided having a truncated member coupled to a distal end with a central opening therethrough, a proximal end and an interior wall having a cam means embossed thereon. A button assembly has a first cylindrical member with a first base portion having peripheral projections engaging the cam means of the housing and a pushing member. The button assembly further has a second cylindrical member with a stem and a second base portion having peripheral projections engaging a terminating portion of the cam means of the housing. The stem of the second member telescopically engages the first cylindrical member. A rod has a first end with wing-like projections positionable within the U-shaped head, a intermediate portion positioned within a hub body of a bicycle wheel and a second end positionable within the button assembly. The rod is capable of axial movement when the button assembly being pushed urges the rod and moves the head away from a bicycle component of a bicycle to release the wheel.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figures 1, 2:
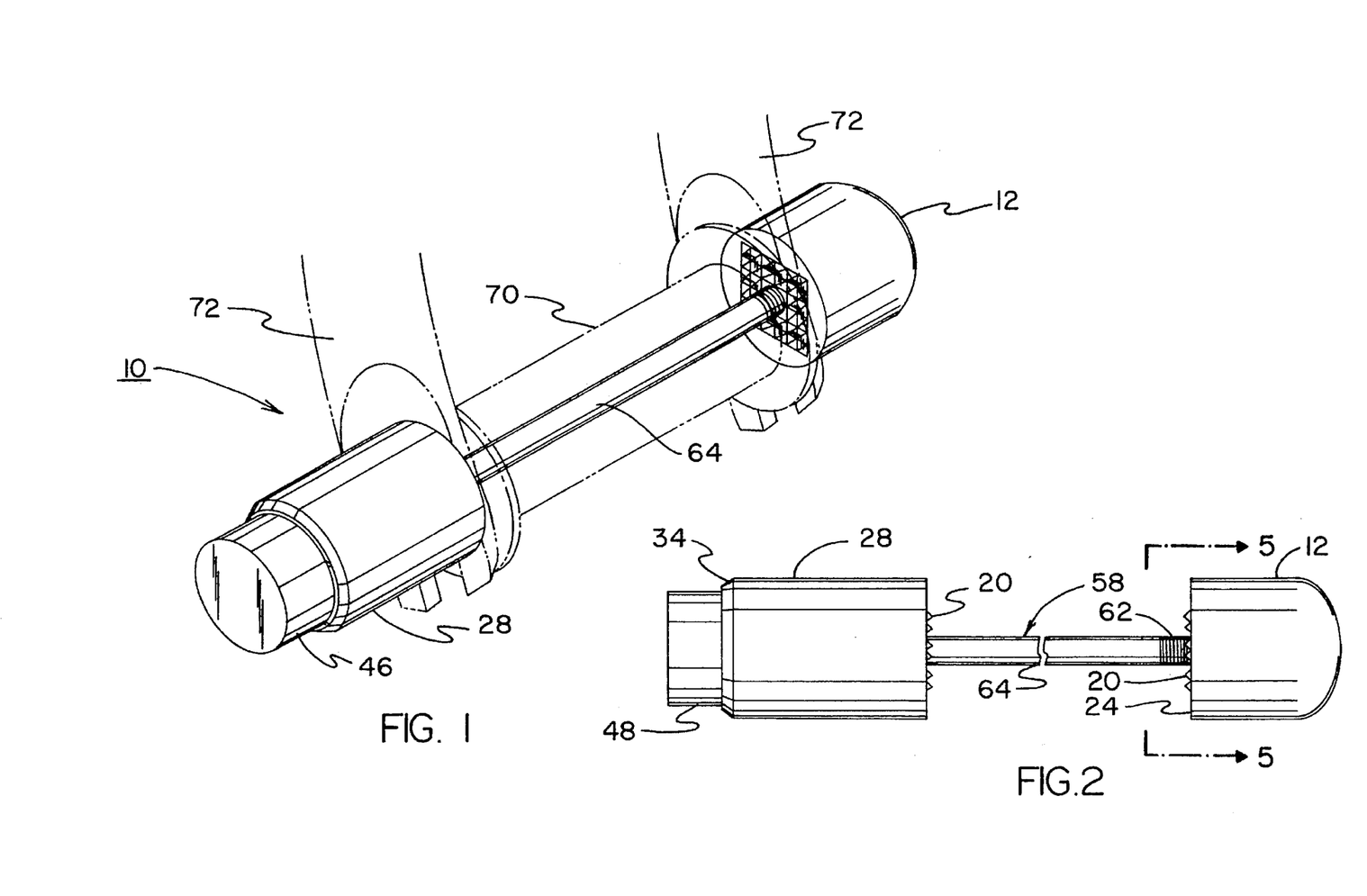
FIG. 1 is a perspective view of the preferred embodiment of the release for a bicycle wheel constructed in accordance with the principles of the present invention.
FIG. 2 is a side view of the preferred embodiment of the present invention.

With reference now to the drawings, and in particular to FIG. 1 thereof, the preferred embodiment of the new and improved Release for a bicycle wheel embodying the principles and concepts of the present invention and generally designated by the reference numeral 10 will be described.

The present invention, the release for a bicycle wheel 10 is comprised of a plurality of components. Such components in their broadest context include a head, a housing, and a rod. Such components are individually configured and correlated with respect to each other so as to attain the desired objective.

Figure 4:
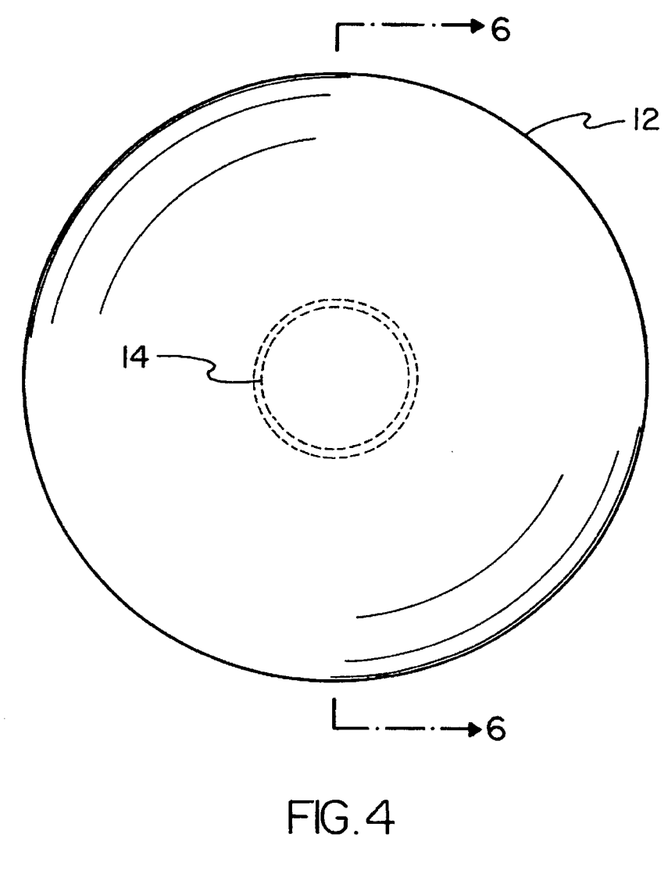
FIG. 4 is a plan view of the cup-shaped head of the present invention.
Figures 5, 6:
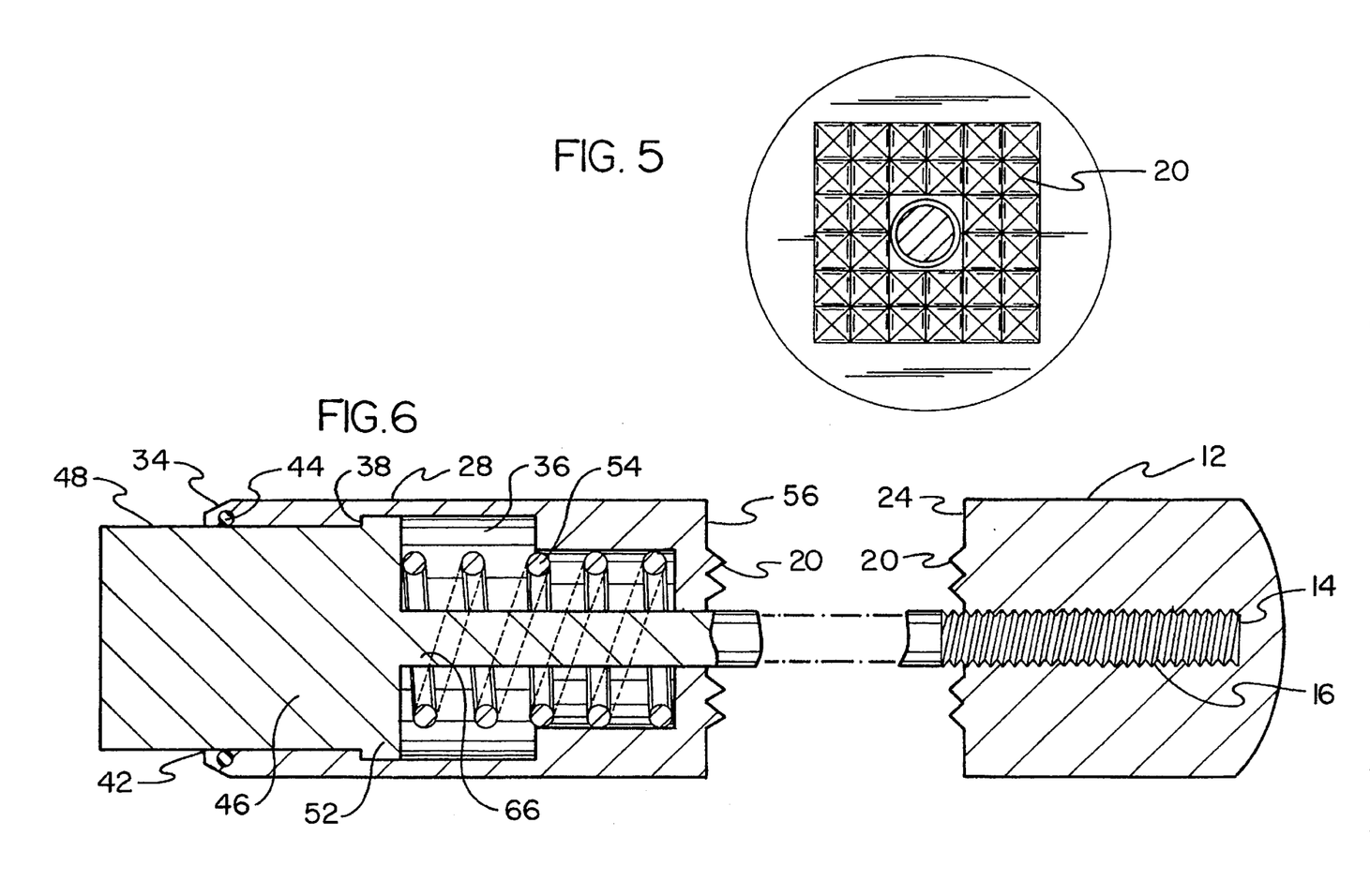
FIG. 5 is a section view of the present invention along line 5—5 of FIG. 2.
FIG. 6 is cross sectional view of the present invention along line 6—6 of FIG. 4.

Specifically, the present invention includes a cup-shaped cylindrical head 12 as shown in FIG. 4. The head is formed of a generally rigid material such as metal. The cup-shaped head has an axial aperture 14 with interior threaded walls 16 therein and a plurality of teeth 20 extending from a proximal end 24. The teeth, as shown in FIG. 2, are used to stabilize and aid in securing the head. FIG. 5 depicts the arrangement of the teeth on the proximal end of the head.

Figure 3:
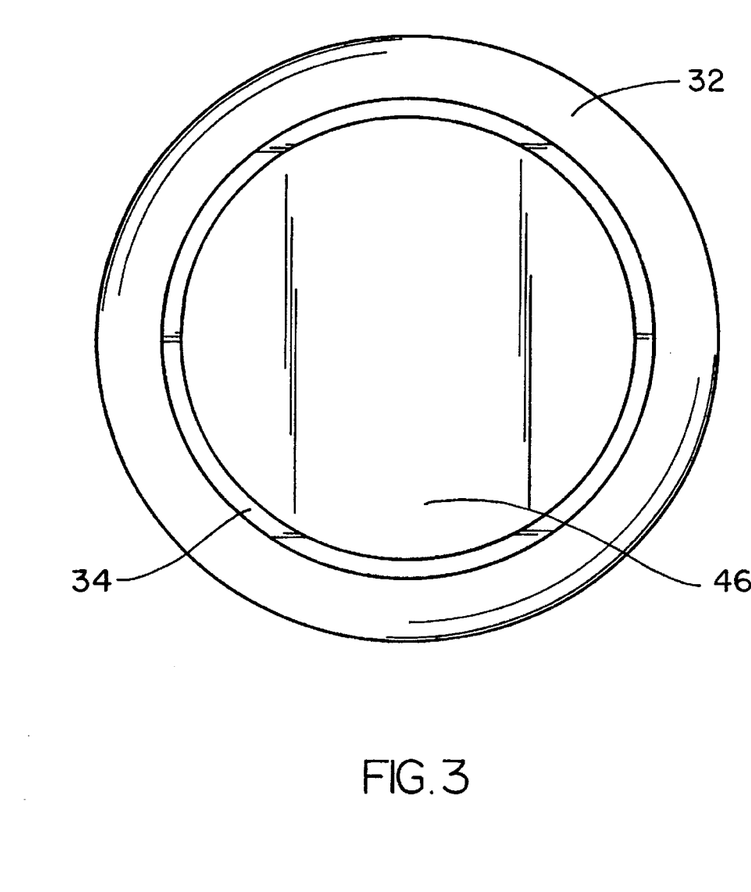
FIG. 3 is a plan view of button end of the present invention.

Included is a metallic housing 28. The housing forms a first cylindrical member 28 with a truncated member 34 that is merely a chamfered edge portion. The first cylindrical member has an interior surface 36 with a circular rim 38 therein, as shown in FIG. 6. The first cylindrical member has an opening 42 that leads into the interior surface. Additionally, an O-ring 44 is adjacent the opening to prevent entry of dirt into the interior of the housing, as shown in FIG. 6. The first cylindrical member is capable of receipt therein a second cylindrical member 46 arranged in a collinear orientation relative to the first cylindrical member as shown in FIG. 3. A portion 48 of the second cylindrical member exists the first cylindrical member through the opening and adjacent the truncated member.

As illustrated in FIG. 6, the second cylindrical member 46 has a circular flange 52 forming a base for engaging the rim 38 of the first cylindrical member 28. The existing portion 48 forms the upper end of a button mechanism. The button mechanism has a button 48 and a helical spring 54 being contained within the housing 28. The spring is interior the first cylindrical member 28 and adjacent the flange 52 and a proximal end 56 of the first cylindrical member.

Furthermore, a rigid rod 58 is provided. The rod is formed of metal. The rod has a first end 62 threaded for engaging the interior threaded walls 16 of the cup-shaped head 12, an intermediate portion 64 and a second end 66 positioned within the housing and integral with the flange 52 of the second cylindrical member 46. As best illustrated in FIG. 1, the intermediate portion of the rod is positioned within a hub body 70 of a bicycle wheel. The rod is capable of axial movement when exterior pressure is applied to the button 48. The exterior pressure pushes the button in the direction of the proximal end 56 of the first cylindrical member. The button being pushed urges the rod and moves the head 12 away from a bicycle component 72 of the bicycle to allow the wheel to be released. The button having the pressure removed is urged away from the proximal end of the first cylindrical member with the spring 54. Pushing the button toward the proximal end of the first cylindrical member allows for loosening of the release fit on the bicycle components of the bicycle. The pressure must be maintain in order to release the wheel and inorder to reposition the wheel between the bicycle components.

Figure 7:
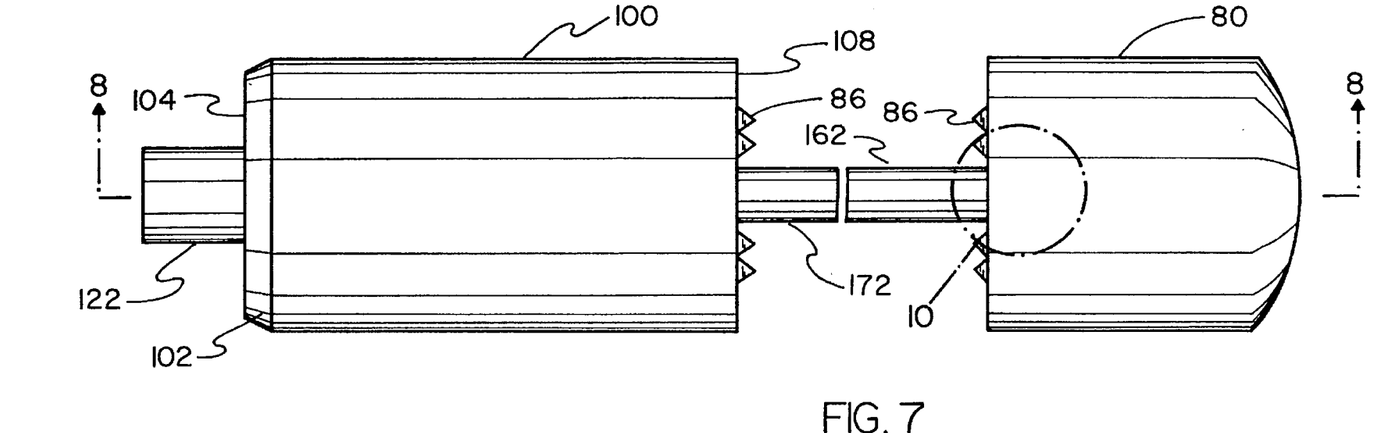
FIG. 7 is a perspective view of an alternative embodiment of the release for a bicycle wheel constructed in accordance with the principles of the present invention.
Figure 8:
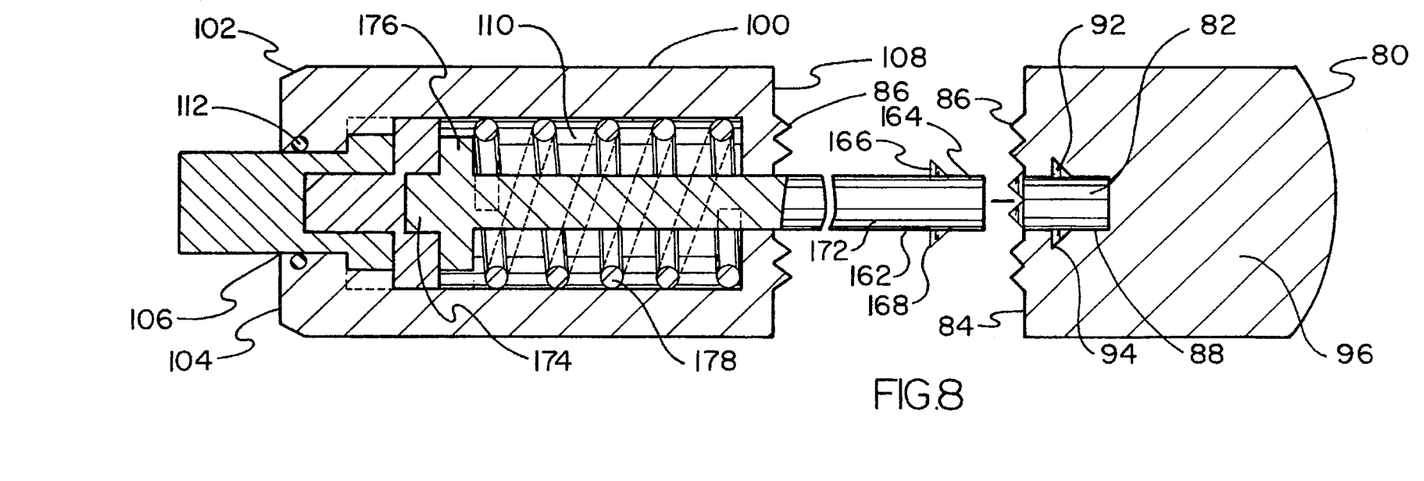
FIG. 8 is a cross sectional view with parts shown as cut away sections of the invention of FIG. 7.

An alternative to the present invention includes a cup-shaped head 80 as shown in FIG. 8. The cup-shaped head has a generally cylindrical aperture 82 therein and a proximal end 84 with a plurality of teeth 86 extending therefrom as shown in FIG. 7. The aperture has an interior wall 88 with a pair of angular openings 92 and 94 extending from the wall into a portion of an interior area 96 of the head. The aperture is positioned in the lower third portion of the cup-shaped head. The teeth are capable of being positioned flush with a bicycle component 72 of a bicycle. The teeth of FIGS. 7 and 8 have of the same pattern as the one depicted in FIG. 5.

Figures 9, 10:
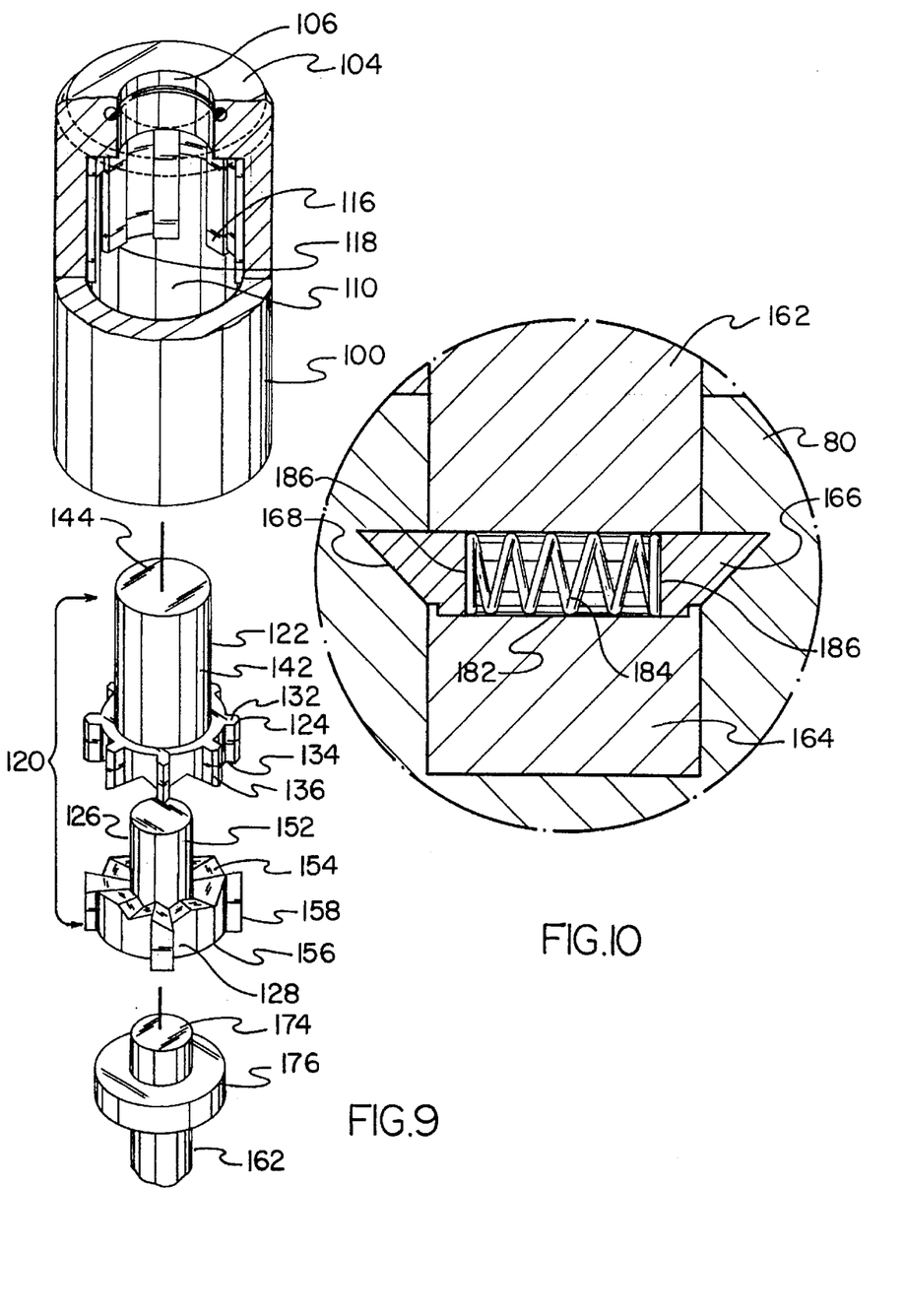
FIG. 9 is an exploded view of the button assembly of FIG. 8.
FIG. 10 is a sectional view of the rod positioned in the head of FIG. 7.

The release also includes a metallic housing 100. The housing has a truncated member 102 and a flat distal end 104 with a central opening 106 therethrough, a proximal end 108 and a cylindrical interior forming an interior wall 110. An O-ring 112 being positioned within the housing and adjacent the truncated member. The O-ring is positioned there to prevent dirt from entering through the central opening. The interior wall has a cam means 116. The cam means is integral the interior wall and projects outwardly therefrom, as shown in FIG. 9. The cam means covering an upper portion of the interior wall beginning just below the distal end 104. The cam means stopping at a ridge portion 118 midway between the distal end and the proximal end of the housing.

A button assembly 120 is provided as shown in FIG. 9. The button assembly has a first cylindrical member 122 with a first base portion 124 and a second cylindrical member 126 with a second base portion 128. The first cylindrical member has a length with the first base portion comprising about ⅓ the length of the first cylindrical member. The first base portion has an upper surface 132 and an indented lower surface 134 with eight peripheral projections 136 therebetween. The projections are proportionately spaced around the first base portion and extending therefrom. The first cylindrical member is positionable within the housing 100 with the peripheral projections engaging the cam means 116 of the housing. The first cylindrical member has a pushing member 142 extending exterior the distal end of the housing through the central opening 106 with the first base portion and contained within the housing. The pusing member has a smooth planar distal end 144.

The second cylindrical member 126 has a cylindrical stem 152 and the second base portion 128 coupled thereto. The stem has a diameter for slidable positioning within the first cylindrical member. The diameter of the stem is slightly smaller than the diameter of the first cylindrical member. The second base portion has a generally cylindrical configuration with a raised front end 154, a flat back end 156 and four generally rectangular peripheral projections 158 proportionately spaced and extending therefrom. The front end engages the lower surface 134 of the first base 124 of the first cylindrical member 122 when the second cylindrical member is positioned therein. The rectangular projections of the second base portion engage the ridge portion 118 of the cam means 116 of the housing 100. The ridge portion prevents the second cylindrical member from engaging the cam means.

As illustrated in FIG. 8, a smooth cylindrical rod 162 is provided. The rod is formed of metal. The rod has a first end 164 with a pair of wing-like projections 166 and 168 spaced therefrom, an intermediate portion 172 and a second end 174 having a flange 176 spaced therefrom with a bias spring 178 adjacent thereto. The bias spring, as shown in FIG. 8, encompasses a portion of the rod. The rod further has a generally rectangular bore 182 spaced from the first end and parallel thereto. As illustrated in FIG. 10, the bore has housed therein a tension spring 184 being in communication with an interior surface 186 of the wing-like projections. The wing-like projections are capable of being retracted by the interior wall 88 of the cup-shaped head 80 when the first end of the rod is positioned within the aperture 82 of the cup-shaped head. When the first end of the rod is directed into the cup-shaped head the wing-like projections are forced into the bore. The wing-like projections 166 and 168 are protracted to lockingly engage the angular openings 92 and 94 of the interior walls of the U-shaped head when the first end is positioned therein. The intermediate portion 172 of the rod is positioned within a hub body 70 of a bicycle wheel.

Lastly, the second end 174 of the rod is positionable within the second cylindrical member 126 of the button assembly 120 with the flat end 156 of the second cylindrical member resting on the flange 176. The rod is capable of axial movement when exterior pressure is applied to the pushing member 142 of the button assembly. The pressure forces the button assembly in the direction of the proximal end of the first cylindrical member. The button assembly being pushed urges the rod and moves the head away from a bicycle component of a bicycle to allow the wheel to be released. The button assembly, having the pressure removed, remains in a protracted position. The button assembly being pushed again urges the rod away from the proximal end of the first cylindrical member with the spring causing the button assembly to return to a retracted position. Pushing the button assembly allows the release to maintain a protracted or retracted position.

The present invention provides an easy to use release for a bicycle wheel that allows the wheel to be removed from between the bicycle component. The bicycle component of the preferred embodiment as disclosed are forks that are part of the front steering assembly of a bicycle. The bicycle component may encompass components such as the frame's fork which hold the rear wheel in position. The release may be used with front and rear bicycle wheels. The release uses a button mechanism that is spring loaded to allow the button to move a rod contained in the hub body. When the button is pressed it moves along an axial line to move the rod and the head away form the fork of the bicycle. This device eliminates the time wasted of taking off a wheel with tool or other quick release methods. Finally, an even further embodiment of the present invention is the release adapted to be utilized with a seat post as a seat post binder Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A release for a bicycle wheel that allows easy removal of a wheel from a bicycle component comprising, in combination:

a cup-shaped cylindrical head having an axial aperture with interior threaded walls therein and a proximal end with a plurality of teeth extending therefrom for stabilizing and aiding in securing the cup-shaped head to a bicycle component;

a metallic housing forming a first cylindrical member with a truncated member, a proximal end and having an interior surface with a circular rim therein, the first cylindrical member being in receipt of a second cylindrical member capable of receipt therein a second cylindrical member with the second cylindrical member arranged in a collinear orientation relative to the first cylindrical member to form a button mechanism, the second cylindrical member having a portion thereof exiting the first cylindrical member adjacent the truncated member to form a button for the button mechanism, the second cylindrical member having a circular flange forming a base for engaging the rim of the first cylindrical member, an O-ring being positioned within the first cylindrical member and adjacent the truncated member and the second cylindrical member for preventing the entry of dirt into the button mechanism, the button mechanism having a helical spring being contained within the housing, the spring being interior the first cylindrical member and adjacent the flange and the proximal end of the first cylindrical member; and a rigid rod having a first end threaded for engaging the interior threaded walls of the cup-shaped head, and intermediate portion and a second end positioned within the housing and integral with the second cylindrical member, the intermediate portion of the rod being positioned within a hub body of a bicycle wheel, the rod capable of axial movement when exterior pressure being applied by a finger to the button and pushes the button in the direction of the proximal end of the first cylindrical member, the button being pushed urges the rod and moves the heat away from a bicycle component of a bicycle to allow the wheel to be released, the button having the pressure removed by removal of the finger from the button and urged away from the proximal end of the first cylindrical member by the expansion of the spring.

2. A release for a bicycle wheel that allows easy removal of a wheel from a bicycle component comprising, in combination:

a cup-shaped head having a generally cylindrical aperture therein and a proximal end with a plurality of teeth extending angular openings extending from the wall into a portion of an interior area of the head, the teeth being capable of being positioned flush with a bicycle component of a bicycle;

a metallic housing having a truncated member, a flat distal end, a proximal end and a cylindrical interior, the housing having a central opening through the flat distal end, the cylindrical interior forming an interior wall, an O-ring being positioned within the housing and adjacent the truncated member, the interior wall having a cam means integral therewith and covering a portion of the interior wall, the cam means stopping at a rigid portion midway between the distal end and the proximal end of the housing;

a button assembly having a first cylindrical member with a first base portion and a second cylindrical member with a second base portion, the first cylindrical member having a length with the first base portion comprising about ⅓ the length of the first cylindrical member, the first base portion having eight peripheral projections proportionately spaced and extending therefrom, the first cylindrical member being positioned within the housing with the peripheral projections engaging the cam means of the housing, the first cylindrical member having a pushing member extending exterior the distal end of the housing through the central opening with the first base portion being contained within the housing;

the second cylindrical member having a cylindrical stem and a second base portion coupled thereto, the stem having a diameter for slidable positioning within the first cylindrical member, the second base portion having a generally cylindrical configuration with a raised end, a flat end and four generally rectangular peripheral projections proportionately spaced and extending therefrom, the raised end engages the first base of the first cylindrical member when the second cylindrical member being positioned therein, the rectangular projections of the second base portion engage the ridge portion of the cam means of the housing;

a smooth cylindrical rod having a first end with a pair of wing-like projection spaced therefrom, an intermediate portion and a second end having a flange spaced therefrom with a bias spring adjacent thereto, the bias spring encompasses a portion of the rod, the rod further having a generally rectangular bore spaced from the first end and parallel thereto, the bore having housed therein a tension spring being in communication with an interior surface of the wing-like projections, the wing-like projections capable of being retracted by the interior wall of the U-shaped head when the first end of the rod being positioned within the aperture of the U-shaped head, the wing-like projections are protracted to lockingly engage the angular openings of the interior walls of the U-shaped head when the first end being positioned therein, the intermediate portion of the rod being positioned within a hub body of bicycle wheel; and the second end of the rod being positionable within the second cylindrical member of the button assembly with the flat end of the second cylindrical member resting on the flange, the rod capable of axial movement when exterior pressure being applied to the pushing member of the button assembly forces the button assembly in the direction of the proximal end of the first cylindrical member, the button assembly being pushed urges the rod and moves the head away from a bicycle component of the bicycle to allow the wheel to be released, the button assembly having the pressure removed remains in a protracted position, the button assembly being pushed again urges the rod away from the proximal end of the first cylindrical member with the spring causing the button assembly to return to a retracted position.

3. A release for a bicycle wheel comprising:

a cup-shaped head having a wall, a proximal end and an interior area therebetween, the head further having an aperture therein with the aperture having a pair of angular openings extending from the wall into the interior area of the head and the proximal end;

a housing having a truncated member, a distal end, a proximal end and an interior wall therebetween, the distal end having a central opening therethrough, the interior wall having a cam means integral therewith, the cam means having a terminating portion;

a button assembly having a first cylindrical member, a pushing member and a second cylindrical member, the first cylindrical member having a first base portion with peripheral projections proportionately engaging the cam mean of the housing and the pushing member, the second cylindrical member having a stem and a second base portion having peripheral projections engaging the terminating portion of the cam means of the housing, the stem of the second member engaging the first cylindrical member; and a rod having a first end with wing-like projections for positioning within the cup-shaped head, an intermediate portion positioned within a hub body of a bicycle wheel and a second end positioned within the button assembly, the rod being moved axially when the button assembly being pushed urges the rod and moves the head away from a bicycle component of a bicycle to release the wheel.

4. The release for a bicycle wheel of claim 3 wherein the proximal end of the cup-shaped head has a plurality of teeth extending therefrom capable of being positioned flush with a bicycle component of a bicycle to secure the positioning of the head.

5. The release for a bicycle wheel of claim 3 wherein the housing has an O-ring being positioned within the housing and adjacent the truncated member.

6. The release for a bicycle wheel of claim 3 wherein the cam means being positioned below the distal end of the housing and extending to a position midway the distal end and the proximal end of the housing to form a ridge portion.

7. The release for a bicycle wheel of claim 3 wherein the pushing member of the button assembly extends exterior the distal end of the housing with the first base portion being contained within the housing.

8. The release for a bicycle wheel of claim 3 wherein the peripheral projections of the first cylindrical member form eight projections that are proportionately spaced and extend outwardly from the first base portion of the first cylindrical member.

9. The release for a bicycle wheel of claim 3 wherein the peripheral projections of the second cylindrical member form four projections that are proportionately spaced and extend outwardly from the second base portion.

10. The release for a bicycle wheel of claim 3 wherein the rod has a bias spring encompassing an upper portion of the rod and generally rectangular bore spaced from the first end and parallel thereto within.

11. The release for a bicycle wheel of claim 10 wherein the bore has a tension spring therein being in communication with an interior surface of the wing-like projections to allow the wing-like projection to be protracted for positioning in a locked manner within the angular openings of the U-shaped head.

* * * * *